US012190759B2

(12) United States Patent
Wong

(10) Patent No.: US 12,190,759 B2
(45) Date of Patent: Jan. 7, 2025

(54) CARRIER FOR USE IN GENERALLY VERTICAL SURFACE PLACEMENT OF COMMUNICATIONS AND/OR ADVERTISEMENTS

(71) Applicant: Thaddeus J. Wong, Chicago, IL (US)

(72) Inventor: Thaddeus J. Wong, Chicago, IL (US)

(73) Assignee: At World Properties, LLC, Chicago, IL (US)

( * ) Notice: Subject to any disclaimer, the term of this patent is extended or adjusted under 35 U.S.C. 154(b) by 188 days.

(21) Appl. No.: 17/341,475

(22) Filed: Jun. 8, 2021

(65) Prior Publication Data

US 2021/0383726 A1 Dec. 9, 2021

Related U.S. Application Data

(60) Provisional application No. 63/036,859, filed on Jun. 9, 2020.

(51) Int. Cl.
*G09F 7/18* (2006.01)

(52) U.S. Cl.
CPC ........ *G09F 7/18* (2013.01); *G09F 2007/1843* (2013.01); *G09F 2007/1856* (2013.01)

(58) Field of Classification Search
CPC .... G09F 15/0056; G09F 15/0012; G09F 7/18; G09F 2007/1843; G09F 2007/1856; G09F 2007/1826; G09F 19/228; G09F 19/22; G09F 19/226
See application file for complete search history.

(56) References Cited

U.S. PATENT DOCUMENTS 808,447 A * 12/1905 Goetz ........................ G09F 7/22 40/617
1,862,776 A * 6/1932 Timberlake ......... G09F 15/0006 40/607.04
2,179,857 A * 11/1939 Lowenthal ............. B42D 5/045 40/107
5,323,552 A * 6/1994 Fritz ...................... A47G 1/065 40/605
5,450,681 A * 9/1995 Stolzman .................. G09F 7/18 40/607.14

(Continued)

*Primary Examiner* — David R Dunn
*Assistant Examiner* — Christopher E Veraa
(74) *Attorney, Agent, or Firm* — Latimer LeVay Fyock LLC

(57) ABSTRACT

A modular sign system is provided comprising a casing for holding a replaceable message therewithin; the casing is configured to be attached to a generally vertical surface, such as a wall or fence, in an urban environment where other means to display a sign are unavailable. The modular sign replaces expensive signs that require specialized stamping or printing and are typically unchangeable, except at great costs, after manufacture. In the present invention a shell is purchased, which can be customized and then easily changed, and allows a modular installation of an inexpensively printed sign card that can be removed and replaced with another message card, from the system without removing the sign from its fixed position, as needed. The shell can be made of molded plastic and can be configured to be attached using cable ties or other flexible connectors and can include elements to protect the replaceable card from weather, vandalism and theft.

12 Claims, 9 Drawing Sheets

(56) References Cited

U.S. PATENT DOCUMENTS

| | | | | |
|---|---|---|---|---|
| 6,347,472 | B1 * | 2/2002 | Dominguez | A47G 1/0627 40/799 |
| 6,719,276 | B1 * | 4/2004 | Bush | G09F 15/0006 40/606.03 |
| 7,036,255 | B1 * | 5/2006 | Santana | G09F 7/18 40/607.04 |
| D595,777 | S * | 7/2009 | Ward | D20/10 |
| 7,698,843 | B2 * | 4/2010 | Hillstrom | G09F 15/0025 40/604 |
| 8,607,487 | B1 * | 12/2013 | Magness | G09F 7/14 206/570 |
| 8,677,663 | B1 * | 3/2014 | Tyszko | G09F 7/18 248/224.7 |
| 8,839,539 | B2 * | 9/2014 | Killian | A47G 1/06 40/781 |
| 8,997,389 | B2 * | 4/2015 | Folk | A47G 1/18 242/379.2 |
| 9,631,419 | B1 * | 4/2017 | Hartley | E06B 5/11 |
| 2002/0083628 | A1 * | 7/2002 | Magid | B62B 3/142 40/642.02 |
| 2002/0166275 | A1 * | 11/2002 | Broadwell | G09F 7/18 40/607.1 |
| 2004/0200104 | A1 * | 10/2004 | Schellas | G09F 15/0012 40/611.08 |
| 2005/0193611 | A1 * | 9/2005 | Lennard | G09F 7/10 40/661 |
| 2005/0262744 | A1 * | 12/2005 | Tollis | G09F 7/18 40/611.07 |
| 2006/0096140 | A1 * | 5/2006 | Waterhouse | G09F 1/14 40/541 |
| 2006/0230657 | A1 * | 10/2006 | Kotze | G09F 11/00 40/454 |
| 2009/0230266 | A1 * | 9/2009 | Hillstrom | F16M 13/022 248/219.4 |
| 2011/0271571 | A1 * | 11/2011 | Lennard | G09F 7/18 248/316.1 |
| 2012/0304513 | A1 * | 12/2012 | Gorelick | G09F 13/18 40/606.19 |
| 2014/0020273 | A1 * | 1/2014 | DeMarco | G09F 15/0037 40/594 |
| 2014/0259831 | A1 * | 9/2014 | Denby | A47F 5/10 211/208 |
| 2015/0007465 | A1 * | 1/2015 | Killian | G09F 1/12 40/657 |
| 2015/0107142 | A1 * | 4/2015 | Burrous | G09F 13/18 40/714 |
| 2015/0305522 | A1 * | 10/2015 | Yu | A47G 1/0633 40/777 |
| 2016/0180750 | A1 * | 6/2016 | Ports | A47F 5/0068 40/711 |
| 2016/0314724 | A1 * | 10/2016 | Benasillo | G09F 7/20 |
| 2018/0090916 | A1 * | 3/2018 | Jett | F16M 13/02 |
| 2018/0122279 | A1 * | 5/2018 | Calby | G09F 15/0062 |
| 2019/0271191 | A1 * | 9/2019 | Crowell | E06C 7/003 |

* cited by examiner

CARRIER FOR USE IN GENERALLY VERTICAL SURFACE PLACEMENT OF COMMUNICATIONS AND/OR ADVERTISEMENTS

FIELD OF THE INVENTION

The present invention concerns a new and novel sign carrier that, can be attached to a fence or other vertical structure when a lawn or other typical sign location is not available, such as in an inner-city location. More particularly the present invention concerns a protective signage casing that readily attachable to a vertical surface such as a wall or fence or other structure and present an elegant and effective notice to passersby of the availability of, for example, property for sale.

BACKGROUND OF THE INVENTION

The present invention relates to an improvement to signage. More specifically it relates to fence or wall signage that addresses an issue or solves a dilemma most often involving signs that need to be attached to lattices such as fences of all types and walls or other flat generally vertical surfaces. Presently configured urban signage is typically attached to fences made of metal, wood or chain link or onto a wall and are lightweight, flimsy and unattractive. Any number and type of sign of this type can be seen in the urban environment, including such signage as warnings, directions, vacancies, opening and closing times for businesses, advertisements, shelter notifications, and others. Real estate professionals, for example, typically use signage to attract viewers interested in a property for sale or rent. Such signs beckon to passersby, whether walking, biking or driving, that there is a property for sale or lease either directly where the sign is posted or in the vicinity thereof. Typically, these signs have post structures that in use are driven into the around; and so, require penetrable ground, such as grass, dirt, sand and the like more often found in rural or suburban areas. Such signs can, with effort, be placed into the ground in such areas and are sturdy and effective and well withstand the elements and even vandalism, due to the expensive materials used in their creation. They are, however, ungainly, heavy and large and require an equally large vehicle for their transportation to the site of their placement. Such staked signs do not work well in urban settings or in industrial areas that may not have penetrable ground surfaces, such as pavement, and where transportation thereto by a large vehicle is unavailable, inconvenient or impossible due to traffic, parking issues or regulations.

Instead, signs in urban areas, of necessity, must be placed onto a structure or on fencing associated with the property. Often these signs are make-shift, small, unsightly and not of a quality desired by professional sales organizations and may violate zoning regulations or other rules of the area. These signs are often not well secured and even when they are, the securing means is also unsightly and ungainly in appearance; appearing cheap or untidy.

Another shortcoming of many currently available signage types is that the contents or message is difficult to change. It is often the case that the notice being communicated by the sign is integral with the sign frame, scilicet, the message of the sign is directly affixed to the sign such that the content is both the sign and the carrier. Such signs are expensive, to the real estate company or agent/broker, as the signs must be reprinted or re-stamped each time a new property is offered, or if some change to the notice is required. This is particularly true when the sign is made of stamped metal or plastic, as most such signs are.

It is therefore an object of the present invention to provide a means for providing signage that can, be attached to a surface, rather than inserted into the ground, that is modular, in that a more substantial carrier of the message is made to accept an inexpensive and readily producible insert, comprising the content or the message. There is a need for signage that is configured as a casing that will accept replaceable message content while being sturdy and luxurious. It is also an object of the present invention to provide such signage that can, when necessary, be adapted to use in locations where ground penetration is possible; so as to provide a system that is adaptable to all locations thereby providing the user with the ability to use such signs in all situations, without the need for the maintenance of both ground penetrating and hangable signs.

Other objects and advantages of the present invention will become apparent as the description proceeds.

SUMMARY OF THE INVENTION

In accordance with the present invention, a casing for housing a sign having information or advertisements to passersby, is provided and comprises a container, having a front side, defining a display opening therein, a rear side, for mounting to a generally vertical surface of a structure, a left-side, a right-side, a top-side and a bottom side, together assembled to create a receptacle having an interior volume configured to hold a generally flat informational card in a secure environment. The top-side of the container comprises a slot therein, through which an informational card is inserted for placement within the interior volume of the box, for cooperative framing within the window opening of the front side. The rear side of the casing comprises one or more sets of openings through which elongated flexible tying elements, for attachment to a generally vertical surface, can be threaded therethrough. The ends of the ties then being used to attach the casing to a fence using a vertical spire or post or other appropriate element, thereby securely holding the casing to a vertical surface. In a preferred embodiment the container is constructed of plastic; the plastic being configured in a molding process.

In some embodiments, a transparent covering, for the opening in the front side, is placed therein so as to protect an informational card placed therein. Additionally, there can be included a second slot in the top surface for placement of a sign topper. The front side of the container comprises removable sign elements allowing the personalization of the casing. The rear side of the container includes an inset or depression, cooperatively placed in association with the opening in the front side, to hold a sign message held therein forward and adjacent to the opening.

In some embodiments, the rear side of the container defines an opening therethrough, such that the casing is open on both the front side and rear side. With display openings on both sides an informational card, printed, on both sides of the card, can be placed in the container such that information can be read from both the front side and rear side of the casing. The casing can be made so that the bottom side of the container defines openings for the attachment of a stand structure, such that when a stand structure is inserted in the casing, through the openings in the bottom side, the casing and stand can be installed on open ground by placement of the stand in or on the ground surface. The back side of the casing can include openings sized for fasteners with a post and perpendicular head, such that the sign can be placed on such fasteners that are fastened to a wall, thereby hanging the casing on a wall such that an informational card placed in the casing can be viewed when looking at the wall.

In a preferred embodiment, a casing for housing a sign having information or advertisements to passersby, is provided. The container is molded from plastic and includes a front side panel and a rear side panel attached together and, having a display opening in the front side panel, the rear side panel configured for mounting to a generally vertical surface of a structure. The container also having a left side, a right side, a top and a bottom, to create a generally rectangular box having an interior volume configured to hold a generally flat informational card in a secure environment. The rear side panel of the container defines an inset or depression, placed in cooperative relationship with the opening in the front side panel, to hold a sign message held therein forward and adjacent to the opening. The front side panel having flat surfaces for the placement of identification or messages thereon and the top side of the container defining a slot through which an informational card can be inserted for placement within the interior volume of the container, for cooperative framing within the display opening of the front side panel. The rear side panel defining one or more sets of openings through which elongated flexible tying elements, for attachment to a generally vertical surface, can be threaded therethrough, the ends of the tying elements then being used to attach the casing to a fence using a vertical spire or post or other appropriate element, thereby securely holding the casing to a vertical surface.

Embodiments so configured can, additional, include a second slot in the top surface for placement of a sign topper; removable and replaceable front panel sections, to allow personalization of the casing and in some embodiments, the rear side panel comprises a display opening therethrough, such that the casing is open for display on both the front side and rear side. In embodiments having display openings on the front and rear sides of the casing, when an informational sign is placed, therein and the casing is attached to a fence, the informational sign is then back lit through the display opening in the rear side when light is projected therethrough. Additionally, an informational card can be placed in the casing, such that information can be read from both the front side and rear side of the casing.

In any embodiment presented, the bottom side of the sign can define openings for the attachment of a stand structure, such that when a stand structure is inserted in the casing, in the openings in the bottom side, the casing and stand can be installed on open ground by placement of the stand in or on the ground surface.

It will be understood that the tying elements noted herein are preferably cable or zip ties. Further the back side of the casing can include opening sized for fasteners having a post and perpendicular head, such that the sign can be placed on such fasteners fastened to a wall, thereby hanging the casing on a wall such that an informational card placed in the casing can be viewed when looking at the wall.

It will be seen then that signage that is sturdy, reusable and can be readily and easily secured to a lattice structure such as a fence, and/or a wall or other structure, with a number of different securing means; and also looks very orderly and professional. Real estate and other professionals have a need for an attachable sign that is easy to use, install and is not unsightly or prone to vandalism; such a sign is often the first point of reference to an interested party.

The modular sign of the current invention can be configured to accept content that can be easily and inexpensively printed and therefore easily and inexpensively switched out by the user. Such a sign system will save the broker/agent money over time as they can change out the content for different properties and locations. It will save the real estate company money as agents that work for that real estate company leave that company and/or new agents are added so that the same fence signs can be used over and over.

This sign system can also be configured to accept a topper; which is another smaller sign that is attached to the top of the sign frame. Toppers are typically used to add information, including the sales agent's name and contact information, the status of the sale (pending, sold, etc.) or other information related to the property that the sign is being used to advertise.

Hence, in a preferred embodiment of the current invention, the fence sign is comprised of a two-part or two-panel frame, preferred made of plastic but not necessarily, that snaps or is otherwise secured together. The frame is designed specifically to be secured to fences like a metal, picket or a chain-link fence but it can also be affixed or secured to other generally vertical surfaces. The rear panel of the frame has various securing means—it can accept nails or hooks, but in the preferred embodiment it has means for accepting cable or zip ties to secure it to the fence or other flat surface. Of course, zip ties are not the only vehicle for securing the fence sign as one could use rope, wire, cable or any other means that can be fed into and through the securing means and then basically affixed to the fence. Further, when it is time to remove the sign, the zip ties can be cut and the sign removed from the fence, having caused no damage to the fence or the sign/casing.

This sign system is designed so that the frame allows the user to change the message of the sign while leaving the frame secured to a fence or other surface to which it is attached. Signs presently in use are often made of stamped and painted metal or plastic and are affixed directly to a fence or other surface; such signs are not aesthetically appealing and look cheap. Also, this fence sign can have its content, or message easily changed out or replaced for different properties of different agents if such change is desired.

The fence sign frame also allows for the sign to be used in urban areas where there may not be any ground to stake a sign into as is common in the suburbs or in front of a suburban single-family home having a yard. The current sign system hides the securing means behind the frame/sign and away from the public view. Also, these signs, which are changeably personalized are reusable as brokers come and go and also can be reused once that property is sold.

A more detailed explanation of the invention is provided in the following description and claims and is illustrated in the accompanying drawings.

DETAILED DESCRIPTION OF THE ILLUSTRATIVE EMBODIMENT

Figure 1:
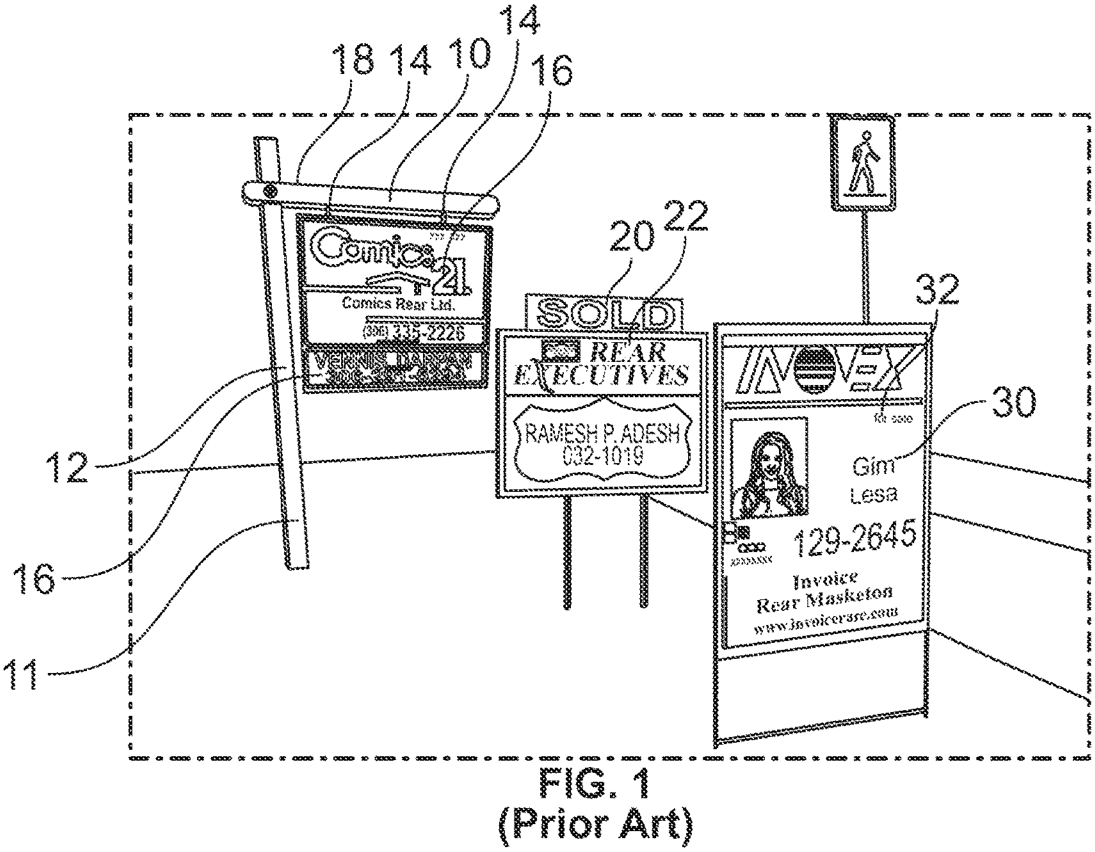
FIG. 1 (Prior Art)
FIG. 1 shows several types of prior art inground signs.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of the Illustrative Embodiment") relates to a requirement of the United States Patent Office, and should not be found to limit the subject matter disclosed herein.

Figure 2:
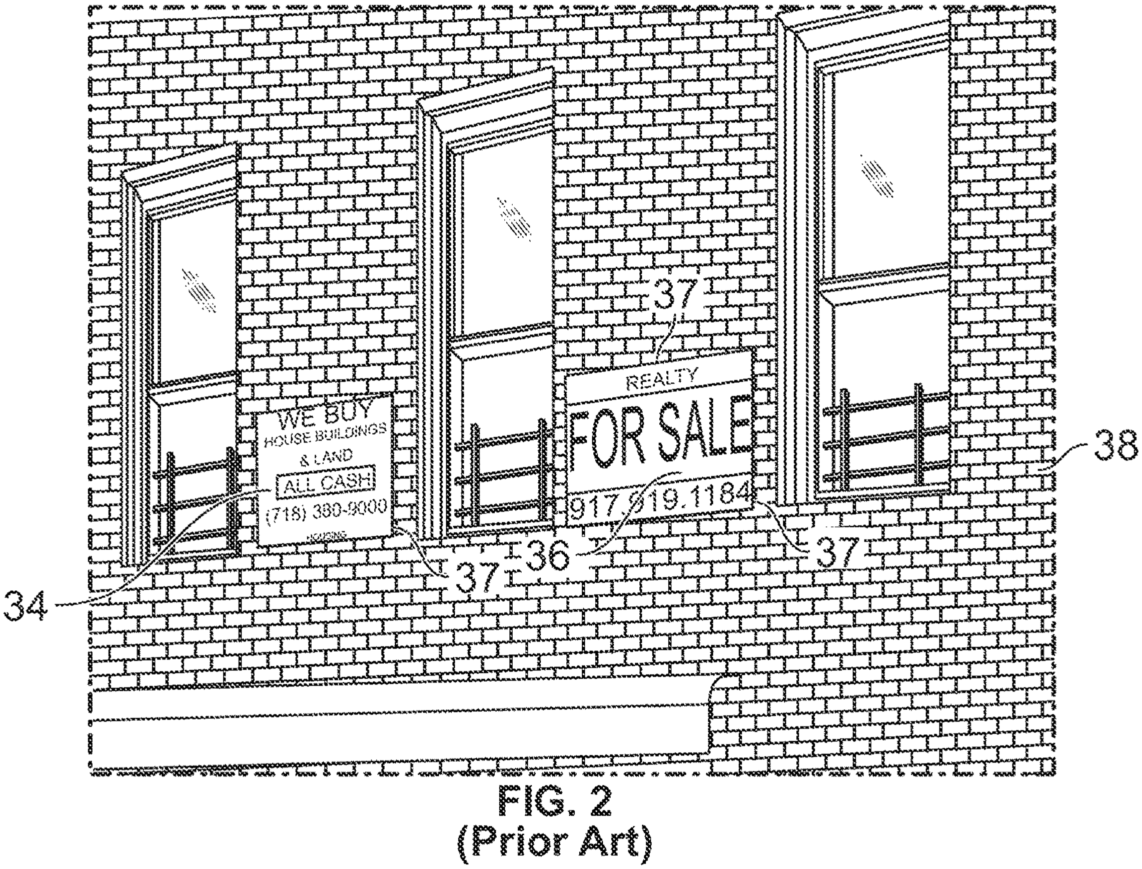
FIG. 2 (Prior Art)
FIG. 2 shows two different wall signs of the prior art.

Referring to the drawing figures, FIGS. 1 and 2 show the presently used signs of the prior art. As shown in that figure, signs 10, 20 and 30 are of various types all of which are used to offer a sale by insertion of the sign into the ground. Sign 10 is a large cantilevered frame sign having means 11 for insertion of the vertical leg 12 of the sign 10 into the ground. Sign 10 has means 14 to hang a general advertisement 16 dependent from a horizontal frame member 18 extending out from the vertical frame leg 12. Sign 10 can include additional signage 17 depending from the general advertisement 16. It will be seen that sign 10 is large and cumbersome and is open to the environment, providing no protection for the informational parts of the signage. As such, the general advertisement 16 and additional signage portions are made of expensive weather resistant materials requiring specialized printing or stamping. It will be understood that in placing such a sign, transportation via vehicle and placement into the ground are required and sign 10, therefore, is not practical in an urban situation where ground penetration is not accessible. Signs 20 and 30, shown in FIG. 1, are other, less expensive types of "in ground" advertisements both of which provide no protection for the message portion of the sign 22, 32 respectively and therefore, such portions must be made of weather resistant materials, often painted or stamped and/or silk-screened metal or plastic sheets. While the size of signs 20 and 30 allow for more easy transportation to a site, they are less impressive to those viewing the signs and also must be placed where an open piece of penetrable surface permits. FIG. 2 shows two types of informational signs 34 and 36 placed onto a brick façade 38 of a building. As can be seen signs 34 and 36 are exposed to the environment and so must be capable of resisting such in order to remain readable. Typically, such signs are made of metal, such as steel, that has been silk-screened, painted or stamped and painted and are expensive to make, particularly with information specific to the site. The placement of such signs takes time and effort to place neatly and typically cause damage to the building surface where fasteners 37 are driven into the brickwork 38.

Figure 3:
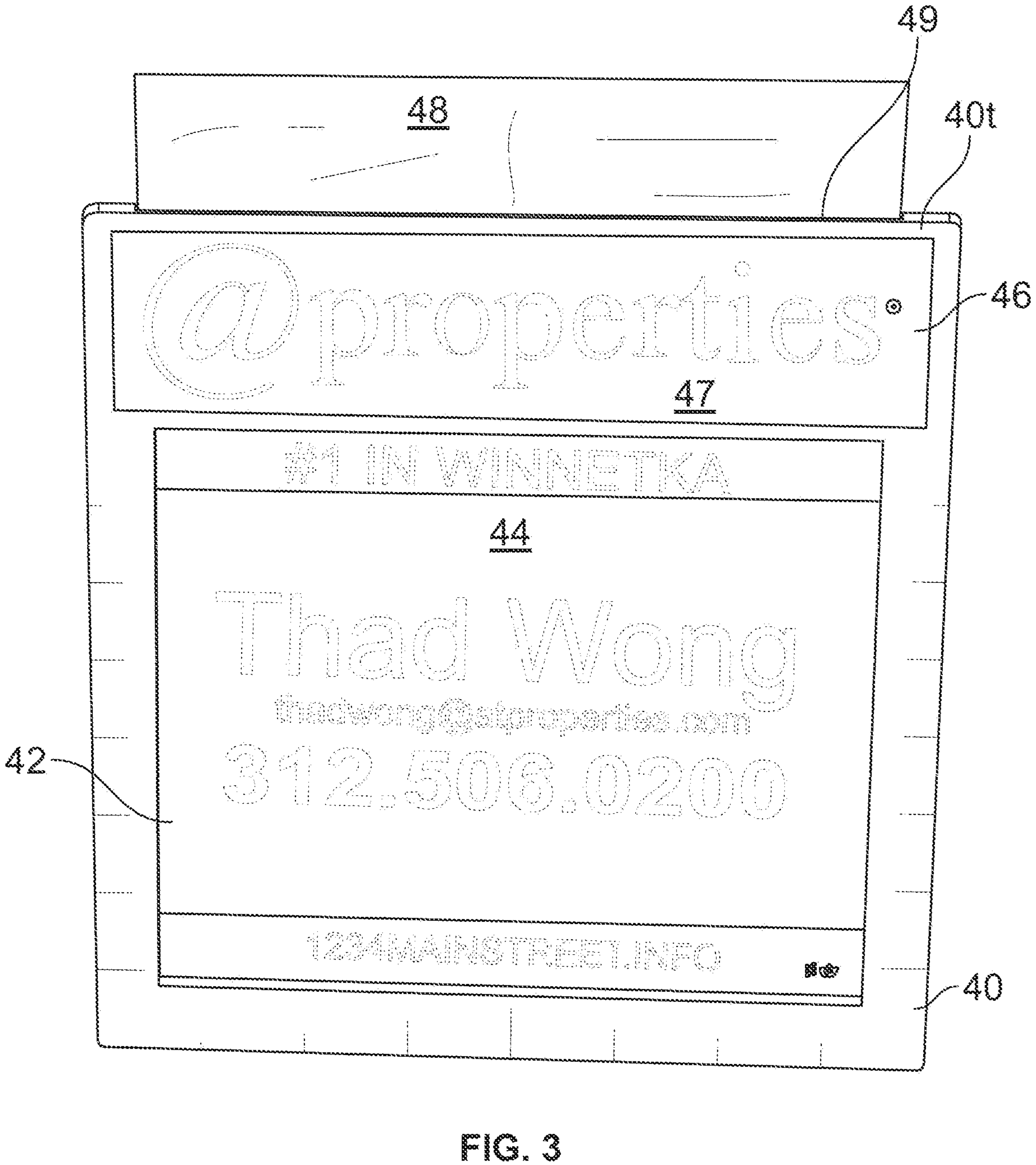
FIG. 3 is an elevational view of the front side of a sign made in accordance with the present invention.

FIG. 3 shows a sign 40 made in accordance with the present invention. In a preferred embodiment, sign 40 is a casing 41 made of plastic in any manner known to persons having skill in the art, including the use of moldings. It will be understood, by persons having ordinary skill in the art, that sign 40 can be made or formed in any manner that provides the benefits that will be described herein, without departing from the novel scope of the present invention. In the present embodiment, as more clearly shown in FIG. 4, casing 41 is shown to have been created from two independently molded sections 43, 52 that have been assembled together with fasteners 50. It will be seen that sign 40 can be constructed much like a frame used for displaying art or photographs, in that it comprises an open section 42 for display of the message board 44. It will be understood by persons having ordinary skill in the art that the open section 42 can comprise merely an opening in the casing 41 or can comprise a transparent protective shield 45 (see FIG. 5), such a plexiglass or other durable see through window material (including glass, polycarbonates, and plastics) formed to provide a protective cover for open section 42, all without departing from the novel scope of the present invention. As such, if the message board is made of a durable material, such a plastic sheet itself, it would not necessarily need a protective shield, and if printed from paper (in a most inexpensive offset process) it would provide a very inexpensive means of creating a message board 44 that would be protected from the elements with the transparent protective shield 45.

Figure 4:
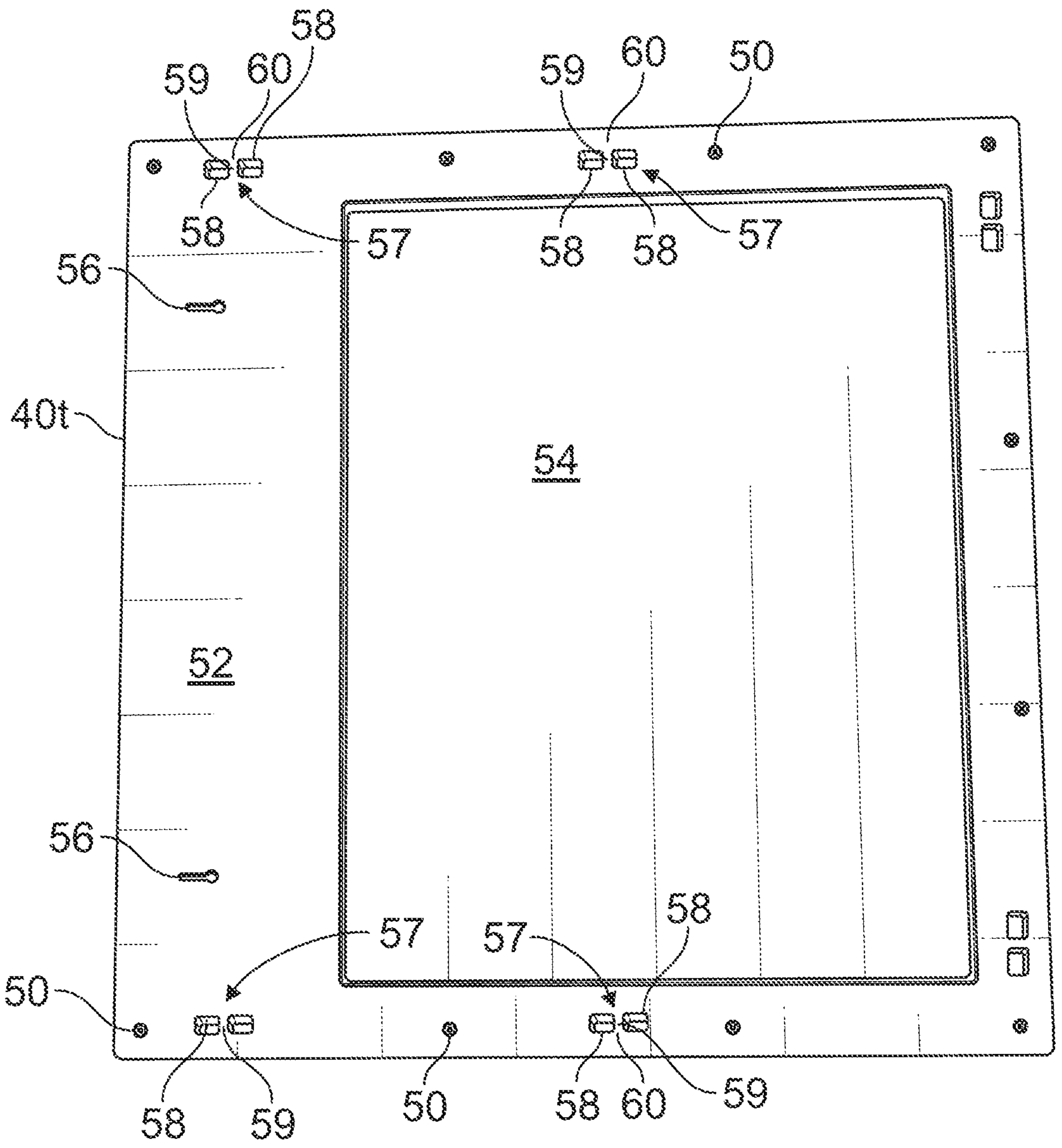
FIG. 4 is an elevational view of the rear side of the sign of FIG. 3.

As further shown in FIG. 4, the casing 41 provides an additional signage section 46, wherein ownership identification plate 47 can be inserted to help identify the sign origination; it will be understood that plate 47 can be made of durable materials and can be removed and replaced within casing 41 to change this information or to add other messages to the sign 40 as desired. Personalization of the sign 40 in this manner allows for the original casing 41 to be transformed and used as desired by future users of the sign. It also permits the construction of a standard casing in quantity, for economic purposes, and then allowing personalization as desired after manufacture, and at a reduced cost. Persons having ordinary skill in the art will understand that as an alternative, the panels of the casing can be created as single elements painted or otherwise printed upon with no means of changing the printing (other than repainting) without departing from the novel scope of the present invention.

In FIG. 3, the added feature of a sign topper 48 is shown. In embodiments of the sign 40 having this feature, a slot 49 on the top side **40*t* is provided to allow the topper to be inserted therein. Topper 48 can be used to quickly advertise any changes to the sales message, such as "new price", "under contract" or "sold", among others. It will be understood that in order to protect the interior of the casing 41 and its contents and to support the topper 48, slot 49 is presently made in the top side surface 40*t*, but is a shallow slot that does not penetrate the interior volume of the casing 41**.

Referring again to FIG. 4, the various elements of the back side 52 of casing 41 can be identified. The frame elements of casing 41, in the present embodiment, are repeated on the back side, and include a recess section 54, created to push message board 44 forward so that it can be more readily seen from the front of the sign 40. Recess section 54 also provides added strength to the structure of casing 41 by creating a structural corrugation of back side 52.

Back side 52 has a number of features to allow its connection to a flat surface such as a wall or fence. For example, provided adjacent top side 40*t* are key hole openings 56 that allow for the placement of the casing 41 onto a wall, using such fasteners as nails or screws, which have heads. Additionally, a number of connection points 57 comprising pairs of depressions 58 molded or otherwise made into the body of the back side 52 each depression being in communication with another via an opening 59, made through the depression connective wall 60 of each pair. It will be understood by persons having ordinary skill in the art that such connective members as cable ties (also known as a hose ties, zip ties, or by the brand name Ty-Rap™ and comprising a nylon flexible tape section with teeth that engage with a pawl in the head to form a ratchet so that as the free end of the tape section is pulled the cable tie tightens and does not come undone) (shown in FIGS. 8, 9 and 10), or cables, ropes, strings, wires or other flexible connection means, can be threaded therethrough and then fitted together about one or more spires 70 of a fence or one or more links in a chain link fence (not shown) to tie sign 40 to a fence. To provide the best fitting against a fence, pairs or groups of four of the connection points 57 securing the casing 41 to the fence in a tidy and supported manner. It will be understood that means for connection that allow for the ends to be attached together with a lock is imagined as the appropriate connection measure to secure the sign to the fence against theft. A single lock and cable attached through one connection point 57*t* and attached to a part of the fence would serve to lock the casing 41 to the fence; such locking would not need to support the sign against the fence, but merely to lock it to circumvent theft. It will be seen in FIGS. 8 through 10 that the casing shown therein is attached to a wrought-iron style fence using zip ties attached at the corners of the casing 41. It will be understood that these securing means are all located on the rear of the frame so that the fence sign, when installed, does not show the securing means. In this manner the sign provides a more elegant presentation of the message, hides the locking means in back to better secure the device from theft and vandalism and presents a means to pull the sign and fence together to aid in the elegance of the presentation. This manner of placement causes no harm to the fence or other surface and is easily removable without damaging the sign or surface, when the sign is no longer needed.

Figure 5:
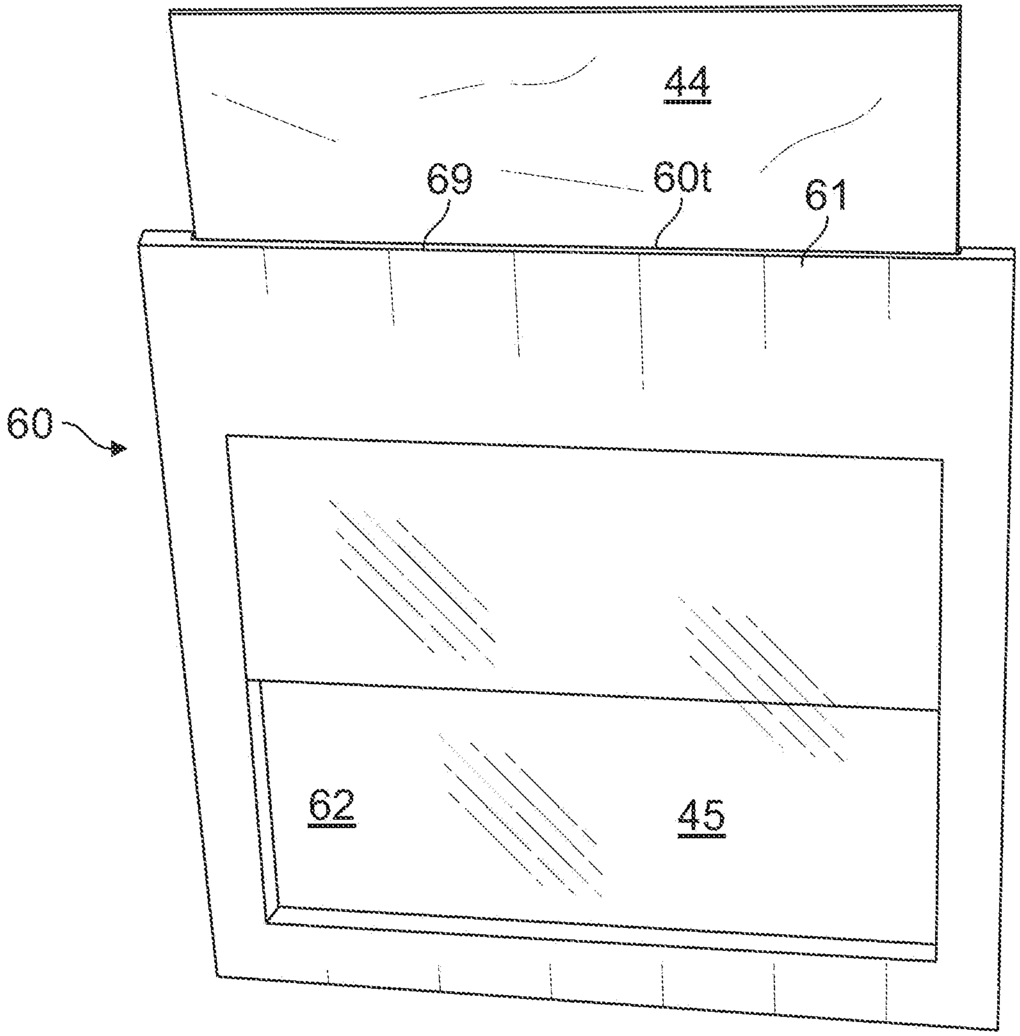
FIG. 5 is a view of a sign made in accordance with the present invention illustrating the technique of placing a message therewithin.

FIG. 5 shows sign 60, casing 61, being loaded with a replaceable message board 44—in the embodiment shown, a slot 69 in the top 60*t* of casing 61 allows the message board 44 to be dropped into the casing 61. As will be seen, the casing 61 of FIG. 5 differs from the casing of FIG. 4 in that the open section 62, or window, in casing 61 extends from the front side 60*f* to the rear side 60*r*, allowing for a message to be displayed on both sides. Such an embodiment can be used on a more open laced fence or on a transparent wall, such as a wall comprising glass or open spaces and/or can be used to provide back lighting to the sign as will be explained below. However, a key feature, shared by all embodiments of the sign disclosed, is the ease of the loading of the message board 44, which can be made of inexpensive board or plastic that can be more readily and inexpensively printed and is easily replaceable when a different message is needed therein. Additionally, FIG. 5 shows that one or both sides of the sign open section 62 can be protected by a transparent covering such as plexiglass or other material, as is known to persons having ordinary skill in the art. Further, translucent coverings, including those having color, can be used on one or both sides to affect a more colorful view of a sign, wherein the sun or artificial light shining from one side of the sign would provide backlighting to the other side of the sign.

Figure 6:
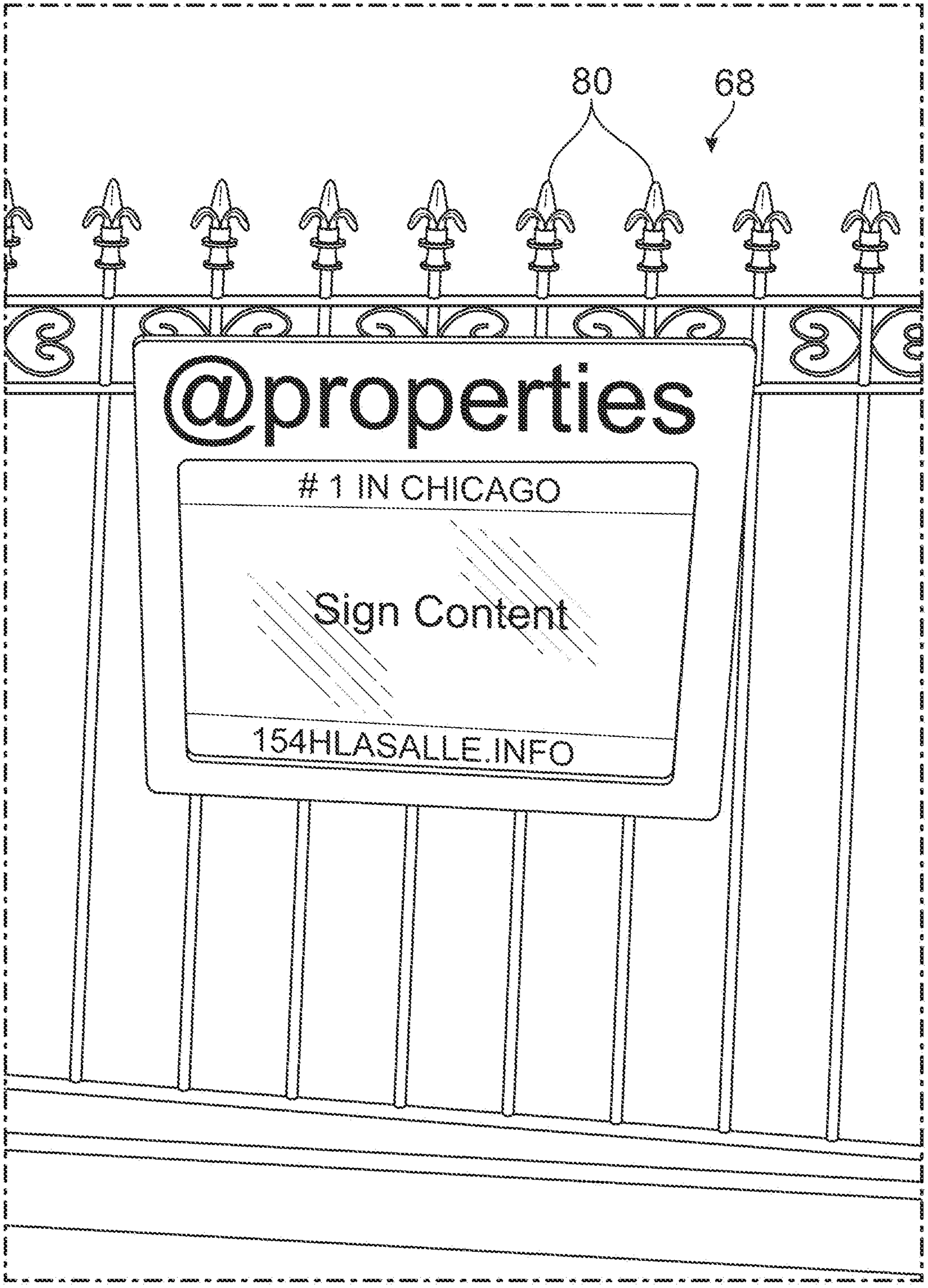
FIG. 6 is an elevational view of a sign made in accordance with the present invention installed on a fence.
Figure 7:
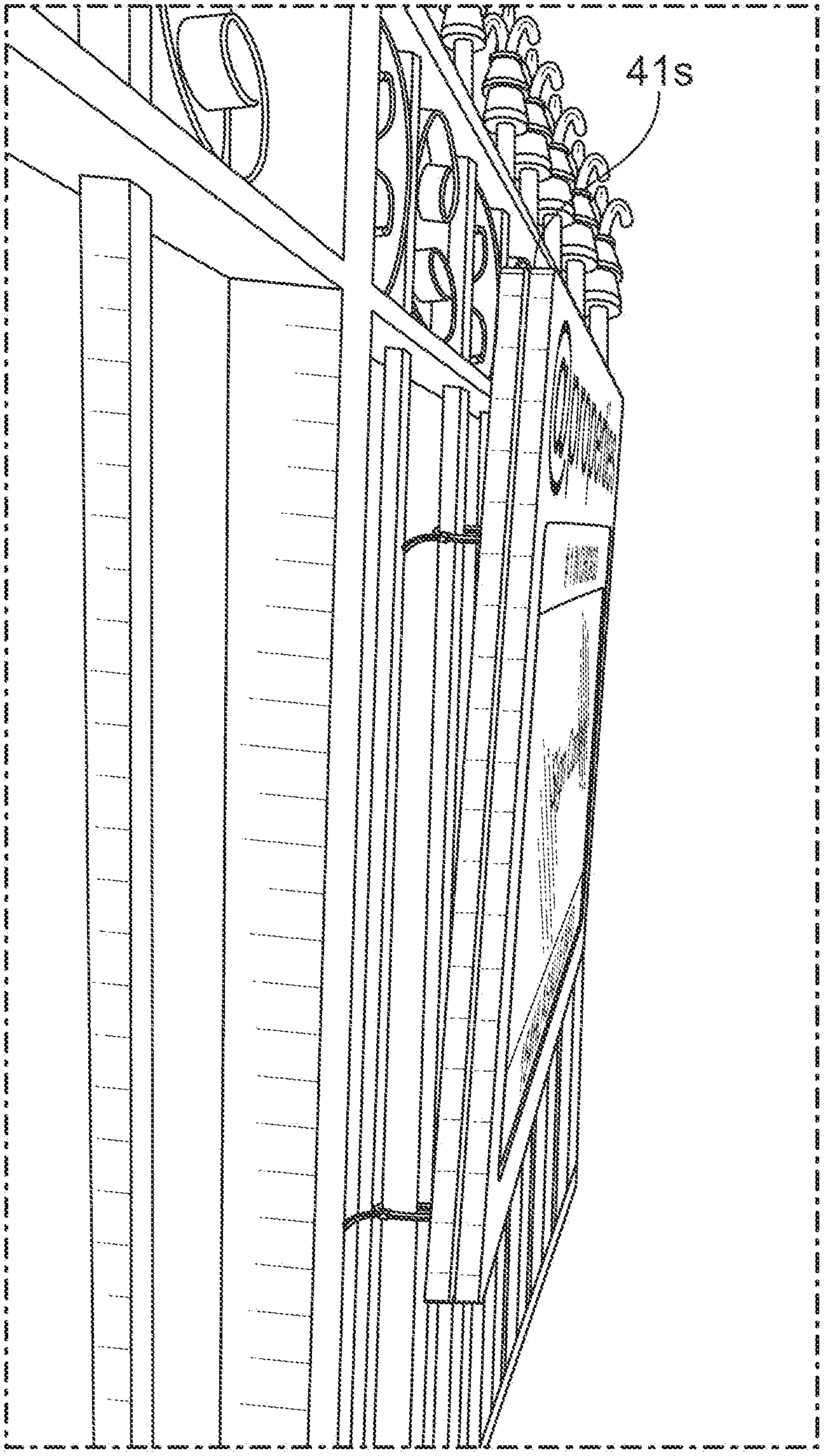
FIG. 7 is a perspective view of the sign of FIG. 6, showing the sign affixed to the fence.

FIG. 6 shows the sign 40, 60 of the present invention in actual use, where the sign 40, 60 casing 41, 61 is attached to a wrought metal type fence 68. Casing 41, 61 sits tightly adjacent the fence 68 while not showing any of the securing means as noted above. FIG. 6 shows a frontal view of the fence sign while FIG. 7 shows a side perspective view, showing the device close against fence 68 and appearing quite smartly thereon. FIG. 7 illustrates the seam 41*s* between the two panels 43, 52 of the frame locked together but are of such a construction as to appear as one piece and this helps to make the sign 40, 60 aesthetically pleasing frontal and side view while maintaining a small overall profile or presence on the fence 68. These figures do show the content or message board 42 inserted into the frame. FIGS. 6 and 7 also show that the front panel 43 can itself include further content 46, 47 such as advertising for the company as shown here or other content or messages that the user may want to make more permanent to the sign. Of course, the front panel 43 can also simply include artwork or whatever the user decides to be more permanent to the sign. 40, 60. This depiction, in actual use, does not show a topper 48 (see FIG. 3) but a topper 48 could be inserted as depicted in FIG. 3.

Figure 10:
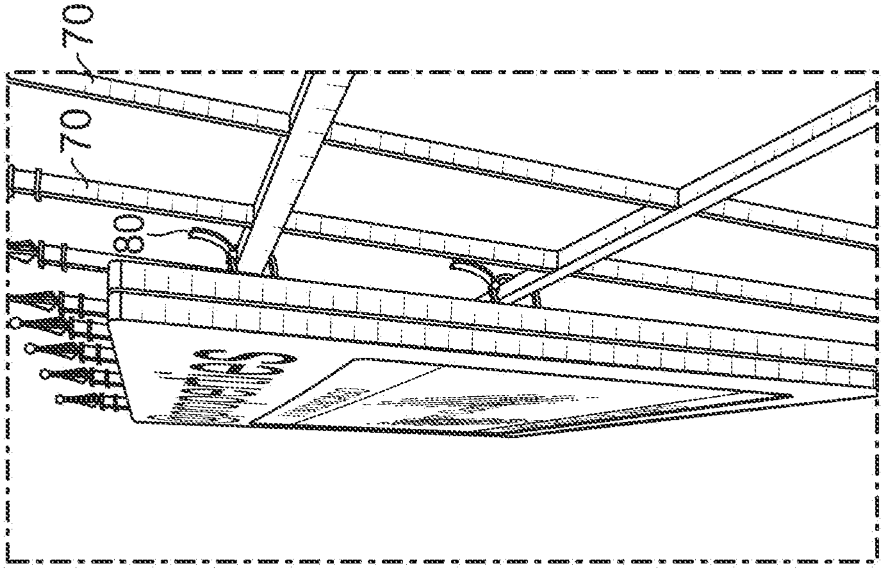
FIG. 10 is another view of the manner of affixation of the sign of FIG. 6 on a fence.
Figure 9:
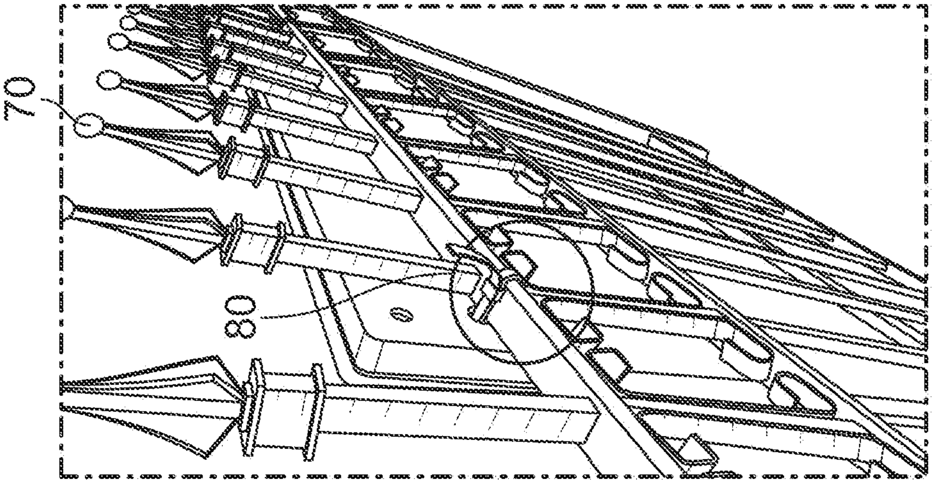
FIG. 9 is another view of the manner of affixation of the sign of FIG. 6 on a fence.
Figure 8:
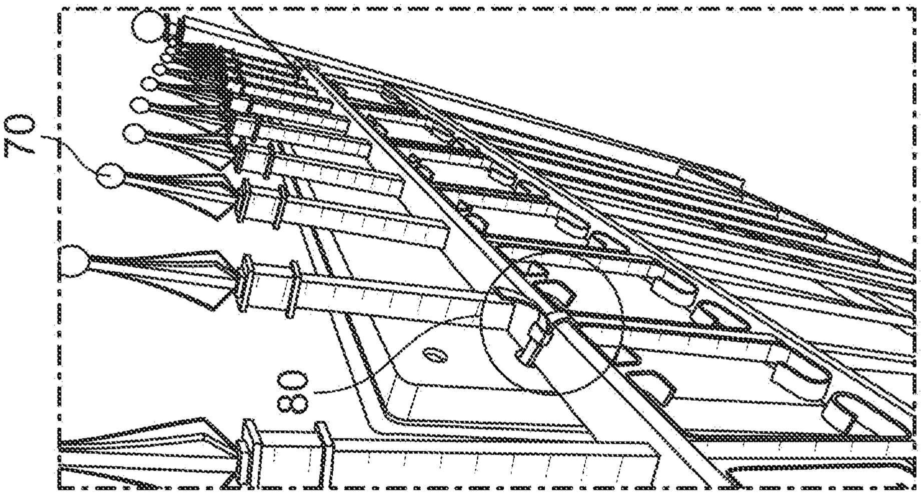
FIG. 8 is a view of the manner of affixation of the sign of FIG. 6 on a fence.

FIGS. 8, 9 and 10 show the fence sign 40, 60 secured to a metal fence 68. FIGS. 8, 9 and 10 particularly show the securing means 80, in this example zip ties 80, for fastening to the fencing 68. These figures show how the sign 40, 60 is secured to the fence 68 and also illustrates how the fastening means 80 are hidden from view making for an aesthetically pleasing fence sign that is very securely fixed to the fence and blends with the fence so as not to be an eyesore.

Figure 11:
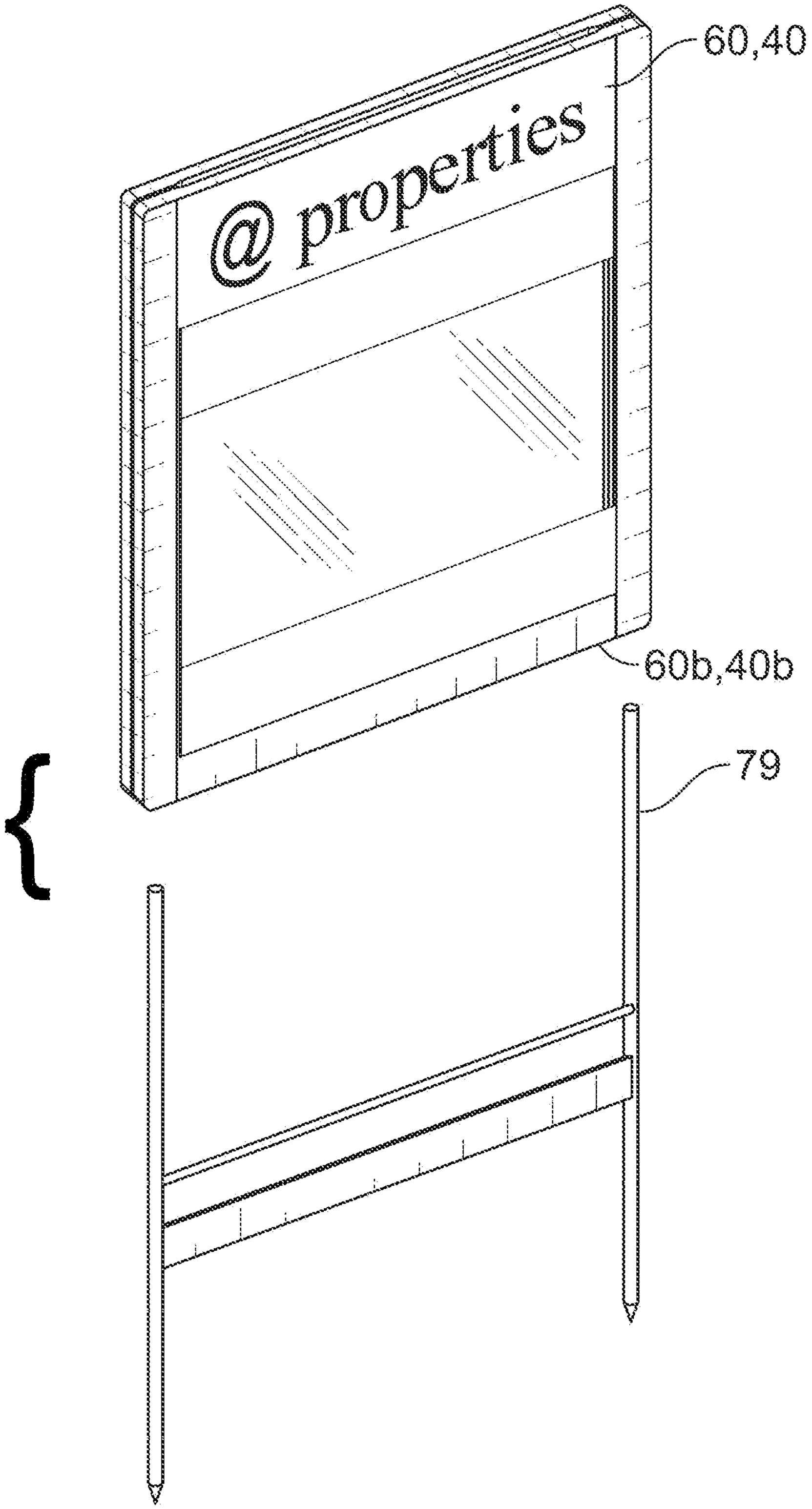
FIG. 11 shows the sign of the present invention with an optional stand for use in ground insertion.
Figure 12:
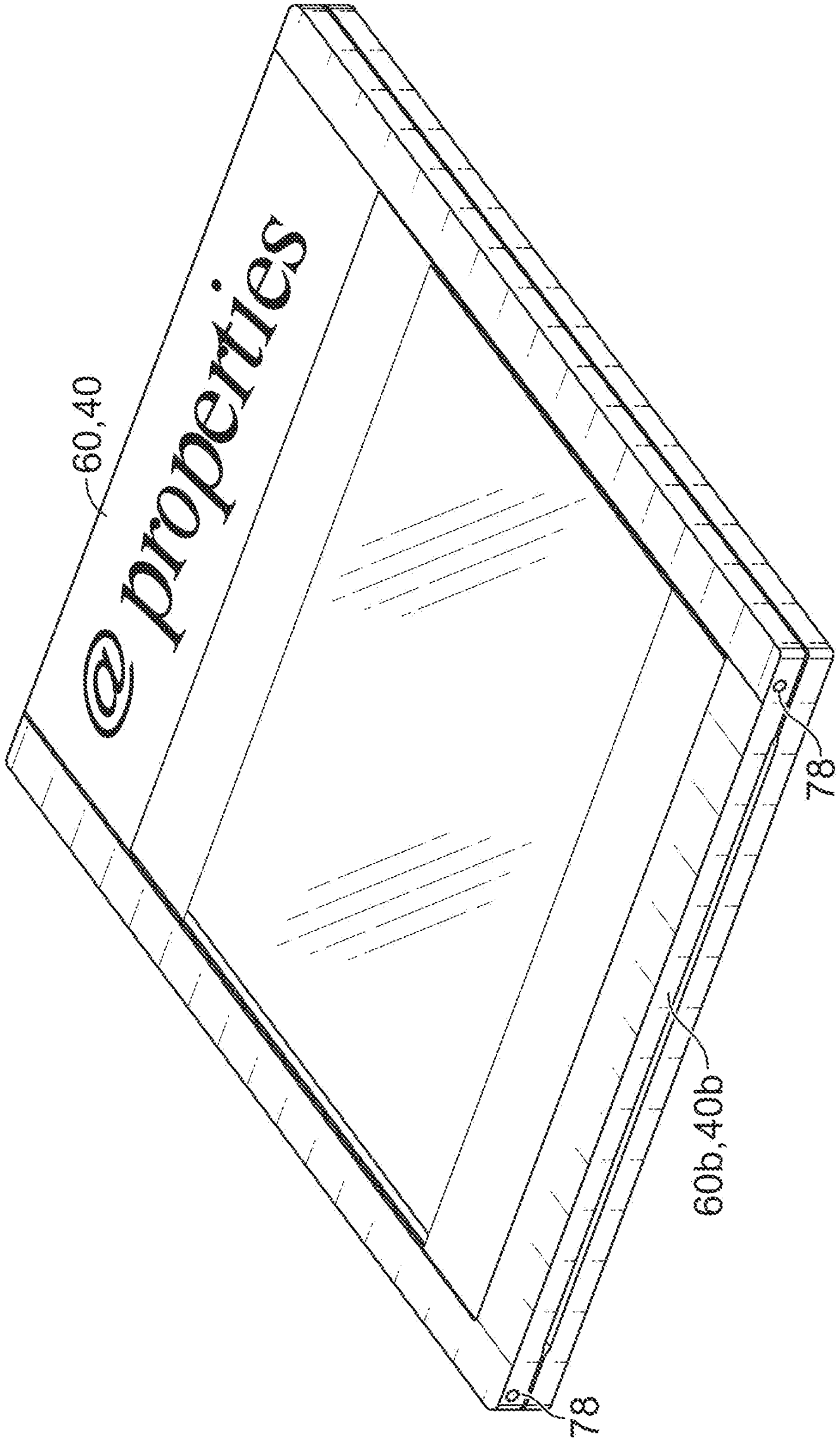
FIG. 12 is a bottom perspective view of the sign of FIG. 11.

FIG. 11 is an illustration of an embodiment of the sign 40, 60 used with a ground support frame 69. It will be understood that the inclusion of some small openings 78 (see FIG. 12) in the bottom panel 40*b*, 60*b* (as more clearly shown in FIG. 12), would allow a frame 79, of a type known to persons having ordinary skill in the art, to use the design of the present invention in a ground location. The use of a sign 60, having openings on both sides, would provide the ability to have one or more messages viewable from either side of the sign, in a manner similar to presently used lawn signage. The benefits of the present invention, ease and low cost of change of message and elegance of appearance, would improve the quality of present-day and prior-art ground signage.

While the present invention is capable of embodiment in various forms, there is described herein the presently preferred and known alternative embodiments. It should be understood that the present disclosure is to be considered as an exemplification of the present invention, and is not intended to limit the invention to the specific embodiments discussed or illustrated. Although illustrative embodiments of the invention have been shown and described, it is to be understood that various modifications and substitutions may be made by those skilled in the art without departing from the novel spirit and scope of the invention.

What is claimed is:

1. A casing for housing a sign having information or advertisements to passersby, comprising:

a container, comprising a front side, defining a display opening therein having a transparent protective shield for closing the display opening to the elements and sealing the interior of the container from damage, a rear side, for mounting to a generally vertical surface of a structure, a left-side, a right-side, a top-side and a bottom side, together assembled to create a receptacle having an interior volume configured to hold a generally flat informational card in a secure environment;

the front side having generally vertical planar surfaces for the placement of identification or messages thereon and therewithin, the front side being free from any attachment openings for use in attaching the casing to a separate object;

the top-side of the container defining a slot thereon onto which an informational card can be placed atop the container, for additional messaging outside of the container; and the rear side comprising a generally vertical wall, having a depressed portion to support signage within the casing and a non-depressed perimeter about the depressed portion, the non-depressed perimeter defining one or more sets of pairs of depressions in the wall, the pairs of depressions being connected together by an opening between each of the depressions comprising a pair of depressions, the openings and depressions contained in the non-depressed perimeter of the wall such that the casing is not penetrated from the rear side wall, the depressed elements being hidden from view from the front of the casing, through which elongated flexible tying elements, for attachment to a generally vertical surface, are threaded, the ends of the tying elements then being used to attach the casing to a fence at a spire or post or other appropriate structure, thereby securely holding the casing to a vertical surface with the tying elements being hidden from the front side view for aesthetic purposes.

2. The casing for housing a sign of claim 1, wherein the container is constructed of plastic.

3. The casing for housing a sign of claim 2, wherein the plastic is configured in a molding process.

4. The casing for housing a sign of claim 1, wherein the front side of the container comprises removable sign elements allowing the personalization of the casing.

5. The casing for housing a sign of claim 1, wherein the bottom side of the sign defines openings for the attachment of a stand structure, such that when a stand structure is inserted in the casing, through the openings in the bottom side, the casing and stand can be installed on open ground by placement of the stand in or on the ground surface.

6. The casing for housing a sign of claim 1, wherein the non-depressed perimeter of the rear of the casing includes depressions within the wall sized for fasteners having a post and perpendicular head, such that the sign can be placed on such fasteners, fastened to a wall, thereby hanging the casing on a wall such that an informational card placed in the casing can be viewed when looking at the wall.

7. A casing for housing a sign having information or advertisements to passersby, comprising:

a container, molded from plastic materials, including a front side panel and a rear side panel attached together and, defining a display opening, having a transparent protective shield for closing the container to the elements, in the front side panel, the rear side panel configured for mounting to a generally vertical surface of a structure, the container also comprising a left side, a right side, a top and a bottom, to create a generally rectangular box having an interior volume configured to hold a generally flat informational card in a secure environment;

the rear side panel comprising a generally vertical wall, having a depressed portion to support signage within the casing and a non-depressed perimeter about the depressed portion, the non-depressed perimeter defining one or more sets of pairs of depressions in the wall, the pairs of depressions being connected together by an opening between each of the sets of the pair of depressions, the openings and depressions being created in the non-depressed perimeter of the wall such that the casing is not penetrated from the rear side wall;

the pairs of depressions defined in the rear side panel, hidden from view from the front of the casing, allow the threading of elongated flexible tying elements therethrough, for attachment of the casing to a generally vertical surface, the ends of the tying elements then being used to attach the casing to a vertical spire or post or other structural element of a fence, thereby securely holding the casing to a vertical surface with the tying elements being hidden from the front view for aesthetic purposes; and, the front side panel having flat surfaces for the placement of identification or messages thereon, the front side panel being free from any attachment openings.

8. The casing for housing a sign of claim 7, wherein the casing comprises a second slot in the top surface for placement of a sign topper.

9. The casing for housing a sign of claim 7, wherein the flat surfaces on the front panel include elements that are removable and replaceable so as to allow personalization of the casing.

10. The casing for housing a sign of claim 7, wherein the bottom side of the sign comprises openings for the attachment of a stand structure, such that when a stand structure is inserted in the casing, in the openings in the bottom side, the casing and stand can be installed on open ground by placement of the stand in or on the ground surface.

11. The casing for housing a sign of claim 7, wherein the tying elements are cable ties.

12. The casing for housing a sign of claim 7, wherein the non-depressed perimeter of the rear side panel of the casing includes depressions, within the wall, sized for fasteners having a post and perpendicular head, such that the sign can be placed on such fasteners fastened to a wall, thereby hanging the casing on a wall such that an informational card placed in the casing can be viewed when looking at the wall.

* * * * *